United States Patent Office

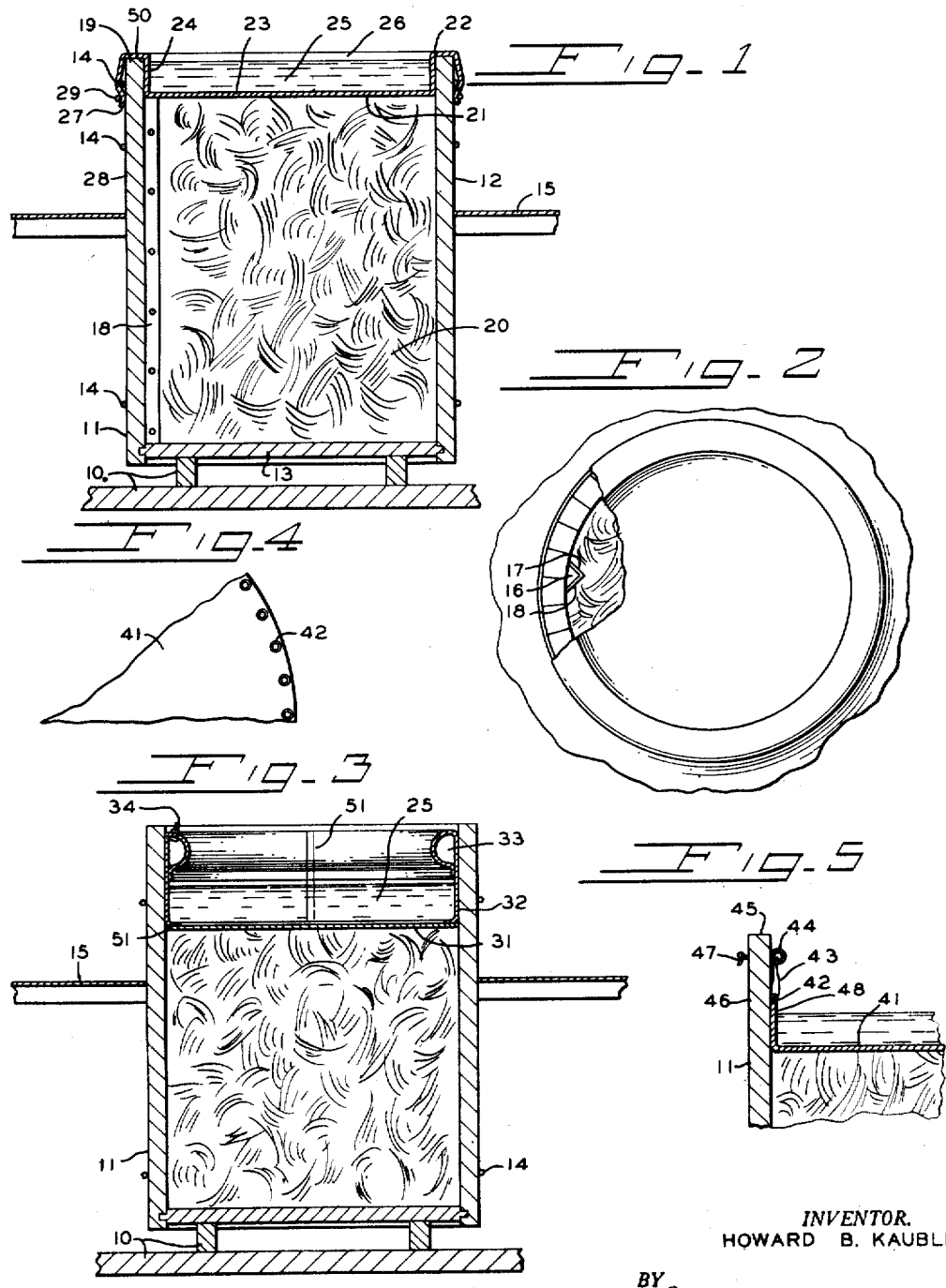

2,804,010
Patented Aug. 27, 1957

2,804,010

APPARATUS FOR TREATING EDIBLE VEGETABLE MATTER

Howard B. Kauble, Clyde, Ohio, assignor to The Clyde Kraut Company, Clyde, Ohio, a corporation of Ohio Application November 13, 1956, Serial No. 621,819

5 Claims. (Cl. 99—271)

This invention relates to the treatment of edible vegetable matter for conversion thereof from the natural state thereof to a state of preservation thereof in wholesome condition. Specifically the invention is concerned with apparatus and equipment for use in effecting treatment and conditioning of such vegetable matter.

This application is a continuation-in-part of my copending application, Serial Number 289,563, filed May 23, 1952, now abandoned.

An object of the invention is to provide a simple and effective equipment or means, adapted for cooperatively facilitating the processing of various vegetable matter of the character that is adaptable to conversion and preservation by what is generally known as a form of pickling accomplished essentially by means of salt that is added to the vegetable matter. Examples of vegetables that are adaptable to pickling by means of the involved apparatus are cabbage, cauliflower, cucumber or pickle, green beans, onions and the like. It is intended that other vegetable matter not ordinarily considered as within the category of vegetables; for example, water melon and other edible matter generally included within the broad classification of vegetable matter, are also within the scope of the instant invention.

The process is also applicable to natural fermentation procedures, for example, wine making and other fruit and berry fermentations. The term vegetable matter is accordingly intended to comprehend a fluid mass, such as expressed grape juice or the like, that is to be fermented. The use of a preservative such as salt, obviously would not be used in such environment.

The following presentation, while directed to the making of sauerkraut, is for the purpose of explanation and not for limitation either to specific vegetable matter or detailed apparatus or equipment referred to in such explanation.

In the commercial manufacture or production of sauerkraut, it is customary or common to use large wooden vats or tanks. Such tanks are of size such that they will invariably extend through a floor of a building and rest upon a suitable foundation at the base of the vat. The tanks or vats are commonly of size approximating twenty (20) feet in diameter and a depth of ten (10) feet, more or less. In establishments that use such tanks or vats for making sauerkraut, the wooden tanks are used for a relatively short period of time and during the remainder of the year when the sauerkraut has been removed from the vats, the vats are maintained substantially full of water in order to avoid drying out of the vats and consequent leaking which would probably be incapable of rectification, short of complete reconstruction of such a vat.

When the vats are to be used for making sauerkraut, the vats are drained and they are then very carefully cleaned, generally by means of wire brushes. The very nature of commercial manufacture of sauerkraut precludes the use of other types of tanks or vats, particularly large metal tanks, as will become more readily apparent from further explanation.

Heretofore, the common practice in producing sauerkraut in such large tanks involved the placing of several tons of shredded cabbage with which proper amounts of salt had been inter-mixed, into such tanks. The weight of the cabbage and the weight of the salt is carefully computed at the time the cabbage is shredded and mixed with the salt and subsequently deposited into the tank. The common practice is to provide a floor or ceiling of the building, at such relation to the upper edge of the tanks that ready access may be had to the tanks beneath the ceiling next above. The ceiling next above is generally provided with a series of removable doors or other closure means so that the tanks can be filled from the floor next above. Ordinarily, the shredded cabbage and salt are commingled in an appropriate conveyance movable upon the floor above the tanks and subsequently the accumulated cabbage and salt is distributed in the tank by manual means; for example, workmen wearing sanitary garments and using pitchforks and the like.

Heretofore, after a tank had been loaded with salted cabbage, and which loading involves the filling of the tank to approximately one or two feet from the upper edge of the tank, a large, disk-like member, generally of wood and of a diameter slightly less than the inside diameter of the vat, is placed over the cabbage. Heavy concrete blocks, or in some instances, natural stones of great weight, are loaded upon the wooden disk and serve to compress the kraut and salt.

Heretofore, the common practice has been to permit nature to take its course from the time that the cabbage is loaded as related.

The heavy weights used to retain the cabbage under pressure are necessary, because the cabbage would tend to float in the brine, not only because of the differences in specific gravities of the brine juice and the fresh shredded cabbage but also because there immediately develops in the salted cabbage, fermentation gases and air that was entrained amongst the shreds of cabbage incident to loading of the vat and which gases would, in the absence of a restraining weight, cause the vegetable matter to float with a substantial portion thereof exposed above the brine juice. Obviously, osmosis cannot occur in any cabbage which is exposed to the atmosphere by reason of loss of brine fluid or evaporation of the fluid from the brine and within which brine the cabbage should have been submerged, and the heavy weight imposed upon the cabbage must be maintained in order to also avoid the accumulation of gases within the mass of cabbage during the processing or converting of the cabbage into sauerkraut.

The practical problems encountered by reason of the factors previously related and explained herein, preclude the use of apparatus and equipment of the character disclosed in Harrison Patent No. 2,345,814, of April 4, 1944. While the Harrison patent explains that the atmosphere is to be excluded from the area above a mass of sauerkraut contained within a receptacle, and that suitable means may be employed for maintaining the shredded cabbage submerged in brine during treatment and storage, the fact is that large metal tanks of the size with which a commercial manufacturer of sauerkraut is concerned, are impractical and moreover, the generalization of the Harrison patent to the effect that means for effecting submergence may be employed, fails to present a practical solution or practical apparatus.

An object of this invention is to provide a large, practical, open-top tank in which vegetable matter is to be processed and with which tank a flexible cover may be associated, the cover being impervious to air and water, but which is so associated or related to the tank and the contents of the tank as will protect the contents of the tank from contamination with air, dirt, vermin, etc., but whereby the vegetable mass may be weighted down as required and yet permit the escape to the atmosphere of entrained air and such gases as develop during fermentation or the preservation process.

Another object of this invention is to provide a flexible air and water impervious cover for a processing tank that is capable of functioning to weight down the vegetable contents in the tank to prevent the same from expanding excessively, if at all, and as a check valve to allow gases to escape from the tank as they form in the vegetable matter, without permitting air to enter the tank and the contents therein.

A still further object of the invention is to provide a cover of a type set forth above which, when in place, forms a container for water, sand or other weighting agent, whereby the quantity of the weighting agent can be adjusted to balance the pressure in the tank and the expansion force developed in the material being processed, and also to form a check valve with the inside wall of the tank through which gases can escape to the atmosphere.

Other objects and advantages of the invention will be apparent to those skilled in this art from the following description taken in conjunction with the accompanying drawings, in which:

Figure 1 is a cross-sectional view of a tank provided with one form of cover and suitable assembly of apparatus embodying the invention.

Fig. 2 is a plan view of the apparatus shown in Figure 1.

Fig. 3 is a sectional view similar to Figure 1 and including a different type of cover element of the invention.

Fig. 4 is an arcuate segment of a circular cover and provided with spaced grommets whereby the peripheral edge of the cover may be retained in relatively fixed relation to the upper edge of the tank.

Fig. 5 is a fragmental view showing a tank provided with suitable eyelets or retaining members for cooperation with the grommets of a cover shown in Fig. 4.

In accordance with this invention, the vegetable to be processed; for example, chopped or shredded cabbage which is to be converted into sauerkraut, is placed in an open tank generally constructed of wooden staves and encircling hoops or the like. The tanks for the commercial production of sauerkraut are approximately eight to ten feet high and vary from twelve to approximately twenty feet inside diameter. Such large tanks hold approximately forty-five thousand pounds or more of prepared cabbage. A batch of prepared cabbage is packed in the tank to a depth within one or two feet from the top thereof. The tank is then covered with a flexible air and water impervious cover. The cover is formed from a thin sheet of material such as transparent pliable plastic, rubber or other suitable composition.

The cover is of a diameter sufficiently in excess of the diameter of the tank, to permit the portion of the cover disposed immediately beyond the central portion of the cover that rests upon the kraut, to project upwardly so as to provide an upstanding wall of such cover material which engages the inside surface of the tank disposed above the cabbage and extending to the upper edge of the tank. The circumferential edge of the cover member is adapted to be retained in elevated position in order to assure the upstanding wall formation of the cover so that weight supplying media applied upon or over the central, disk-like portion of the cover and disposed between the opposed faces of the upstanding wall of the cover, will not escape from the recessed formation so provided by means of the indicated cover formation. Any of various means may be resorted to for maintaining the upright or upstanding wall arrangement of the peripheral portion of the cover.

The weighting material is introduced into the recess provided above the central portion of the cover, and may be of any suitable type or character which has sufficient fluidity or mobility together with adequate weight, to assure that the upstanding wall portions of the cover will be firmly pressed and held against the adjacent inner surface of the tank. Examples of such weighting substance are water, sand, or comparable materials. The use of water is obviously preferred because of its ready availability and the fact that it should have no abrading effect upon the material of which the cover is made.

The tanks are generally provided with a vertically extending passageway or duct, extending from approximately the bottom of the tank to approximately the level to which the cabbage is to be loaded into the tank. Such passage providing means is vertically provided with a series of apertures throughout its length, whereby communication between the mass of material within the tank and the interior of the passageway may be effected. Such duct or channel is provided in order that sampling of the brine may be made at various depths of the cabbage mass. The upper end of the sampling channel or duct should be disposed a sufficient distance below the upper edge of the tank so that the flexible cover will extend over the upper end of the sampling duct.

In Figure 1, a suitable foundation 10, forming part of the building construction, supports the lower end of the tank 11. The tank 11 comprises the vertical wall 12 which may consist of a series of heavy wooden staves and an appropriate bottom 13, fitted to the lower ends of the staves or vertical wall 12 of the tank. Suitable encircling hoops 14 are employed for retaining the tank elements in assembled formation. By reason of the size of the tanks, same are shown as extending through the floor 15 of an appropriate building. The upper edges of the tanks are ordinarily disposed at a height of about three or four feet above the floor 15. Ready access to the upper portion of the tank and to the interior of the tank is therefore accomplished from the level of the floor 15. At what approximates ordinary room height, a suitable floor, not shown, extends above the tank and in such upper floor, suitable trap doors or the like are provided through which the commingled salt and cabbage may be discharged from suitable tractionally supported conveyances. Ordinarily, one trap door is provided above each of the tanks and through which each of the tanks is filled with cabbage etc. The shredding operation is performed by apparatus, not shown, in accordance with customary procedure, such shredding apparatus being adapted to discharge the shredded cabbage into the tractionally supported conveyances alluded to, and which are utilized in accordance with the customary practice of weighing the shredded cabbage and applying the salt to the cabbage while in such conveyance, whereupon, the cabbage is discharged through a trap door into a tank. The sampling channl or duct 16, provided within the tank, may be provided by means of a pair of boards or planks 17 and 18, which are secured upon one another on one of their longer edges and may be secured at their other longitudinal edges to the inside wall of the tank, in any suitable manner preferably arranged so that they may be readily removed for cleaning the interior of the tank and the interior of the board members providing the duct 16. The upper ends of the boards 17 and 18 are disposed one or two feet beneath the upper edge 19 of the tank.

After a mass of cabbage and salt, indicated at 20, has been compiled in the tank 11, and which mass is of a volume such that it will readily compress so as to have the upper surface 21 thereof disposed about one or two feet beneath the upper edge 19 of the tank 11, a flexible cover 22 is placed over the tank and the central portion of the cover is depressed so as to rest upon the mass of cabbage 20. By reason of the larger diameter and area of the cover in relation to the tank, the peripheral edges of the cover may extend over and above the upper peripheral edge 19 of the tank and downwardly over and adjacent the outer wall of the tank 11, as shown in Figure 1.

The central disk-like portion 23 of the cover is retained in contact upon the cabbage mass, whereas the portion of the cover extending beyond the central disk-like portion thereof, is developed into an upstanding, cylindrical wall 24. The wall 24, if forming part of a flat cover member, will necessarily include a number of folds in the cover material; however, by reason of the flexible nature and character of the cover material, the folds will be firmly pressed outwardly by reason of the weight of the water 25 received in the upwardly opening recess 26 formed above the cover and between the upstanding wall 24 of the cover when positioned over a tank as shown in Figure 1.

The peripheral edge 27 of the cover may be secured against the outer surface or wall 28 of the tank by any suitable means; for example, a cord 29. The purpose of providing a retaining element such as the cord 29 is primarily to preclude accidental displacement of the peripheral edge of the cover, centerward of the vertical wall of the tank and which could result in escape of the weighting substance between the inner face of the tank wall and the adjacent face of the upstanding wall portion 24 of the cover member. If the indicated relationship of the upstanding wall section of the cover should be impaired, there might be contamination of the cabbage or sauerkraut by some of the water escaping from the recess 26 to the upper layer of the cabbage mass in the tank. One of the practical phases of the situation is that as workmen move about on the floor 15, they might accidentally disturb the peripheral edge of a cover unless it is adequately secured or anchored.

By reason of the nature of the flexible cover and the fact that it may be readily moved to permit access to the sampling duct 16, notwithstanding the fact that during the major portion of the fermentation process, the upper end of the duct is sealed, it is possible to readily obtain samples of brine from various levels of the cabbage mass in the tank while substantially precluding appreciable air contamination of the mass incident to the introduction of a suitable sample hose intermediate the upstanding wall 24 of the cover incident to projection of such sampling hose into the sampling channel or duct 16.

In Fig. 3, a modified form of cover is shown, wherein the cover element comprises a circular, central disk portion 31 and to the peripheral edge of which is applied a cylindrical section 32 of similar flexible material. The cylindrical portion 32 may be welded or secured to the disk portion 31 by any suitable means or process for providing a positive sealed connection between the cylindrical portion 32 and the center of the composite cover comprising the parts 31 and 32. The upper end of the upstanding vertical wall portion of the cover 32 may in turn, be provided with a suitable extension that may be projected over the upper end of the tank in the manner shown in Fig. 1, or if desired, the upper end of the cover section 32 may be turned inwardly in order to provide an air cell 33. If such air cell arrangement is employed, a suitable valve 34 may be provided for introducing air or some gas into the air cell so that upon introduction of the weighting material 25, for example, water, into the recess or compartment formed above the disk portion 31 and centerward of the cylindrical, vertical portion 32 of the composite cover, it will serve to retain the upper end of the cover elevated and so provide an upstanding wall of the cover, and yet preclude escape of the water from the recess in the top of the cover and into the cabbage mass.

In Fig. 4 there is shown a fragment of a flat cover 41, provided with grommets 42 and through which retaining means such as a cord 43, may pass and whereby such cords may be used for connecting the peripheral edge to eyelets 44 that may be attached upon the inner face of the tank wall, as shown at Fig. 5. Obviously, the eyelets 44 may be secured at the upper edge of the tank, either upon the upper edge 45 or upon the outer surface 46 of the tank. An alternate form of attachment means adapted for cooperation with such grommets 42, would be the provision of a plurality of hooks 47 which could be mounted in an appropriate manner near some part of the upper edge of the tank wall, and one of which is shown in Fig. 5 as being mounted upon the outer face 46 of the tank. Obviously, under such an arrangement the cover must be of sufficient size that beyond the upper edge of the upstanding wall 48 of the cover, there shall be sufficient material to extend over the upper edge 45 of the tank and permit the hook 47 to receive the grommets 42 of the cover.

The cover 22 may be made of any suitable flexible plastic or rubber material. If it is plastic, it is preferred that the plastic be transparent so that the contents of the tank can be seen through it. A plastic substance of the character referred to may be vinyl plastic. The joinder of a vertical wall portion such as shown at 32, to a central disc portion 31, may be effected either by means of a suitable cement or by any appropriate method or substance that will effect the desired unification of the two parts in a sealed relationship that will preclude any seepage between opposite sides of the composite cover. If the plastic material is of a character such that a joinder may be effected by means of heat, thus providing a welded joint which would be an effective seal of the character indicated, that would be another way of joining a flat, disk-like center portion of the cover to the upstanding wall portion of such cover. The plastic substance should be such that it can be made sufficiently thin or sheet-like so that it will readily flex and conform, including some degree of stretching if necessary, in order that the weight of the water or other weighting substance will cause the upstanding portion of the cover to enter any crevices that might exist in the adjacent, inner wall area of the tank and with which the cover is to make an effective seal. The seal is intended to preclude entry of any foreign matter or gas into the cabbage mass, yet being such that the gases that develop within the cabbage mass, as well as any air that was entrained in the cabbage at the time of loading of the tank, may escape between the tank wall and the cover by reason of the pressure exerted upon the cabbage mass and the fluid about the mass.

In arrangements exemplified in Fig. 1, wherein the water 25 does not completely fill the recess 26, the escaping gases, particularly carbon dioxide, would pass above the level of the water and provide a small pocket of carbon dioxide gas at the area indicated generally at 50, and disposed between the inner surface of the tank wall and the adjacent portion of the upstanding wall 24 of the cover. That gas, if placed under sufficient pressure and under varying conditions, would be and should be displaced so as to pass over the upper edge 19 of the tank and then fall downwardly along the outer surface of the tank. It is not intended that the cord or other retaining means exemplified at 29, should provide a seal against the escape of gases after they have passed over and beyond the upper edge 19 of the tank. Such carbon dioxide pocket, which might develop in the area indicated at 50, and which would encircle the inner wall of the tank above the upper surface of the mass of water 25, would provide an area devoid of oxygen and to that extent would provide an area in which micro organisms that require oxygen, could not survive.

The explanation referring to a cover of vinyl plastic type, is merely exemplary, it being appropriate to use various other types of cover material that are impervious to water intended to repose upon the central portion thereof, and to also be impervious to brine and being nonreactant to the substance confined in the tank and beneath the cover. Rubberized fabric is an appropriate sheeting material that is adapted for such cover purposes.

Cabbage which is weighted down and sealed from the air as above described, will be in as good condition at the very top layers thereof as at any other points in total depth of the batch. Since the top layers of the batch cannot come in contact with air, there is no spoilage. It has been found in practice that a batch of 45,000 pounds of cabbage processed by weighting down with a flexible cover which serves also as a check valve while the cabbage is undergoing its chemical change, will give 100% yield of sauerkraut. In other words, the process make it possible to prevent loss of up to about 20% of cabbage per batch of 45,000 pounds. In addition to that, the finished product is uniform throughout and of much better quality than sauerkraut produced by the prior art methods.

The water in space 26 not only acts to weight down the cabbage but also forces the cover against the inside surface of the tank with sufficient pressure to form with the inside surface of the tank, a check valve. As gases form in the tank they rise to the top of tank 11 and escape between the cover and the tank wall and then downwardly past the drawstring to the atmosphere. If the water does not provide sufficient weight to balance the expansion forces developed in the cabbage or other material being processed, sand or other heavy weighting agents may be used, either alone or with water.

The cover may be referred to as a floating cover since it is adapted to rise and fall with the mass disposed beneath it. It is preferable that the central disk portion of the cover be of a diameter slightly in excess of the internal diameter of the tank, particularly in those types of covers wherein a vertical wall section is attached to a flat, center disk portion; for example, as shown in Fig. 3. That is to assure an effective seal being provided around the perimeter of the central disk-like portion of such composite cover.

The provision of what may be termed a measure of fullness or surplusage of the cover element at the approximate peripheral area of the central disk-like portion of the cover, an illustration of which appears superfluous in the drawings, not only assures a seal at the upper edge of the cabbage mass, but also affords adaptation of the cover to slight movements of the cover with the cabbage mass as the mass may expand or contract slightly for any of various causes, without impairing the essential seal at the upper edge of the cabbage mass. That seal however, does not preclude exhausting of gases and entrained air, because of the weighted mass supported on the cover functions to express the gas or air, so that at all times, the cabbage mass is confined within what may be termed a closed chamber or compartment, and which closed chamber is completely filled by the cabbage and brine juice together with any occluded gases that may exist and be retained in the mass of cabbage and juice. On the other hand, any free gas; for example carbon dioxide, is promptly exhausted from the closed chamber without modifying the closed condition of the chamber in that same is closed against the atmosphere and it is completely filled at all times with only the cabbage and brine juice, and the cabbage and the brine juice are at all times, under the effect of pressure imposed thereon by the cover and the weighting mass supported by the central disk-like portion of the cover, the upstanding wall of the cover and the supporting tank wall disposed above the mass of cabbage and brine juice.

To the extent that there may be slight expansion and contracting of the compacted mass of vegetable matter and juice for any one of various reasons including temperature variations, the referred to fullness or surplusage of the cover at the outer edge of the central, disk-like portion of the cover, permits the central, disk-like portion of the cover to float on and move with the compacted mass, without disturbing the closed chamber established within the tank portion containing the compacted mass of vegetable matter, and such floating of a portion of the cover will not impair the seal formed by the upstanding wall portion of the cover upon the adjacent upstanding wall portion of the tank. To the extent that the cover may be produced from several pieces of flexible material, any seams 51 in the cover and particularly in the upstanding wall section as illustrated in Fig. 3, are to so integrate the material, for example, by welding, or solvent, etc., that the cover is impervious at such seams, as is the material itself impervious to the substances to which the cover is exposed.

As stated, the covers illustrated are circular and ordinarily would be made in this form because tanks are a rule are round. However, if tanks are other than round, in transverse section, the shape of the cover would be modified to suit the shape of the tanks.

Having thus described the invention, it will be apparent to those skilled in this art that various modifications and changes may be made in the illustrated and described embodiments thereof without departing from either the spirit or the scope of the invention.

Therefore, what is claimed and now desired to be secured by Letters Patent is:

1. An apparatus for curing edible vegetable matter, the combination with a tank having an open top, and compacted vegetable matter in the tank in quantity sufficient to reach to a level approximately at the top of the tank but spaced therefrom, of a water, gas and air impervious flexible cover of such dimensions that the margin thereof extends downwardly along the upper portion of the outside wall of the tank, and the central portion extends downwardly into the tank in supporting engagement with the vegetable matter with the margin of the central portion in position to be engageable with the inside wall of the tank at a location adjacent to but above the top of the vegetable matter, means for drawing the outside marginal edge of the cover against the outside wall of the tank so as to permit escape of gases from within the tank, and a flowable weighting agent on the central portion of the cover for weighting the cover down on the vegetable matter and forcing the margin of the central portion against the inside wall of the tank to form therewith a check valve which permits the escape of gases formed in the vegetable matter while preventing the ingress of air from the atmosphere into said vegetable matter.

2. Apparatus for processing edible vegetable matter comprising in combination, a vertically disposed tank open at the top and having an upstanding wall terminating at the said top opening of the tank, a compacted mass of vegetable matter and fluid consisting of juice of said vegetable matter and substance for processing and preserving said vegetable matter in said tank, said compacted mass being of a quantity sufficient to reach a level spaced substantially below the top opening of the tank, a water, gas and air impervious flexible cover, said cover comprising a central portion resting upon the compacted mass and a peripheral upstanding wall conforming to the adjacent upstanding wall portion of the tank above said compacted mass, and a weighting substance of mobile character disposed upon the central portion of the cover and contacting the upstanding wall of the cover, said weighting substance being of weight adequate to compress the compacted mass at all times in a chamber closed against the atmosphere and to press the upstanding wall portion of the cover into a seal relationship to the adjacent upstanding wall portion of the tank wall, adequate to preclude unintentional entry into the compacted mass but permitting exhaustion of free and non-occluded gas from the compacted mass to the atmosphere.

3. Apparatus according to claim 2 together with means for positively fixing the upper end of the upstanding wall portion of the cover to the tank wall for retaining the upstanding wall portion of the cover in upstanding position.

4. Apparatus for processing edible vegetable matter comprising in combination, a vertically disposed tank open at the top and having an upstanding wall terminating at the said top opening of the tank, a mass of vegetable matter in said tank, said mass being of a quantity sufficient to reach a level spaced substantially below the top opening of the tank, a water, gas and air impervious flexible cover, said cover comprising a central portion resting upon the mass and a peripheral upstanding wall conforming to the adjacent upstanding wall portion of the tank above said mass, and a weighting substance of mobile character disposed upon the central portion of the cover and contacting the upstanding wall of the cover, said weighing substance being of weight adequate to compress the mass at all times in a chamber closed against the atmosphere and to press the upstanding wall portion of the cover into a seal relationship to the adjacent upstanding wall portion of the tank wall, adequate to preclude unintentional entry into the mass but permitting exhaustion of free and non-occluded gas from the mass to the atmosphere.

5. Apparatus for processing edible vegetable matter comprising in combination, a vertically disposed tank open at the top and having an upstanding wall terminating at the said top opening of the tank, a mass of vegetable matter in said tank, said mass being of a quantity sufficient to reach a level spaced substantially below the top opening of the tank, a water, gas and air impervious flexible cover, said cover comprising a central portion resting upon the mass and a peripheral upstanding wall conforming to the adjacent upstanding wall portion of the tank above said mass, a weighting substance of mobile character disposed upon the central portion of the cover and contacting the upstanding wall of the cover, said weighting substance being of weight adequate to compress the mass at all times in a chamber closed against the atmosphere and to press the upstanding wall portion of the cover into a seal relationship to the adjacent upstanding wall portion of the tank wall, adequate to preclude unintentional entry into the mass but permitting exhaustion of free and non-occluded gas from the mass to the atmosphere, and means for sustaining the upper edge of the upstanding wall portion of the cover above the mobile weighting substance disposed on the central portion of the cover.

References Cited in the file of this patent

UNITED STATES PATENTS

| Number | Name | Date |
|---|---|---|
| 446,254 | Forrester | Feb. 10, 1891 |
| 934,277 | Brown | Sept. 14, 1909 |
| 1,906,685 | Wiggins | May 2, 1933 |
| 1,931,525 | Boardman | Oct. 24, 1933 |
| 2,040,798 | Schoonmaker | May 12, 1936 |
| 2,106,880 | Toaz | Feb. 1, 1938 |
| 2,202,238 | Thompson | May 28, 1940 |
| 2,345,814 | Harrison | Apr. 4, 1944 |
| 2,401,038 | Barton et al. | May 28, 1946 |
| 2,465,755 | Sanders | Mar. 29, 1949 |
| 2,487,400 | Tupper | Nov. 8, 1949 |
| 2,578,090 | Plummer | Dec. 11, 1951 |
| 2,638,261 | Poole | May 12, 1953 |

UNITED STATES PATENT OFFICE

CERTIFICATE OF CORRECTION

Patent No. 2,804,010                      August 27, 1957

Howard B. Kauble

It is hereby certified that error appears in the printed specification of the above numbered patent requiring correction and that the said Letters Patent should read as corrected below.

Column 4, line 53, for "channl" read -- channel --; column 5, line 29, for "quately secured or anchored." read -- disturb the peripheral edge of a cover unless it is adequately secured or anchored. --; column 7, line 6, for "make" read -- makes --; line 44, strike out "of"; column 8, line 9, for "are" read -- as --; column 9, line 10, for "weighing" read -- weighting --.

Signed and sealed this 29th day of October 1957.

(SEAL)

Attest:

KARL H. AXLINE
Attesting Officer

ROBERT C. WATSON
Commissioner of Patents